Dec. 15, 1931. W. M. LEWIS 1,836,762
CULTIVATOR
Filed Feb. 4, 1929
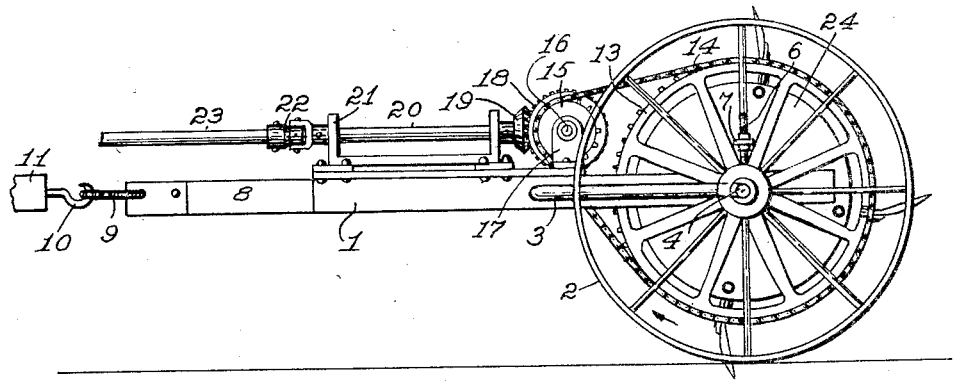
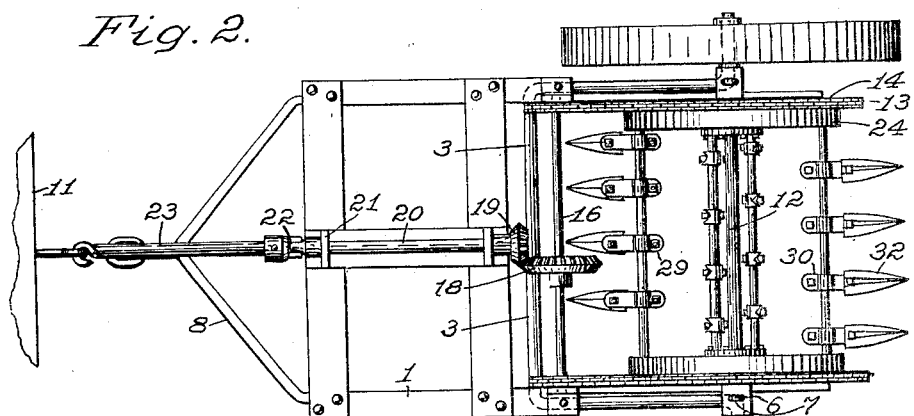
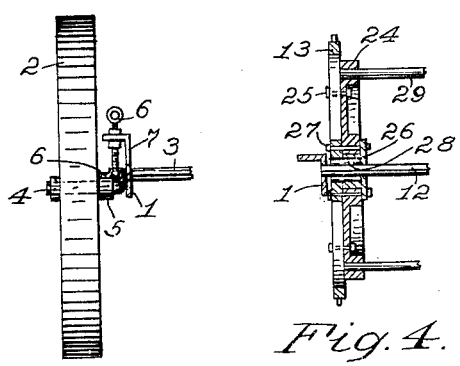
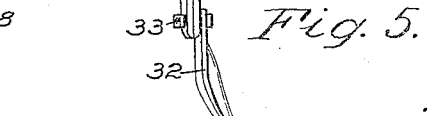
Inventor
William M. Lewis.
By G. C. Kennedy
Attorney Patented Dec. 15, 1931

1,836,762

UNITED STATES PATENT OFFICE

WILLIAM M. LEWIS, OF BEAVER TOWNSHIP, IOWA

CULTIVATOR

Application filed February 4, 1929. Serial No. 337,375.

My invention relates to improvements in cultivators, and the object of my improvement is to provide a rotary cultivator adapted for the elimination of June grass from alfalfa without injury to the latter.

This object I have accomplished by the means which are hereinafter described and claimed, and which are illustrated in the accompanying drawings, in which Fig. 1 is a side elevation of my improved alfalfa cultivator, and Fig. 2 is a top plan thereof. Fig. 3 is a detail elevation of one of the carrying wheels, illustrating the method of mounting it for vertical swinging adjustments upon the frame. Fig. 4 is a vertical central cross section of one of the large sprocket-wheels and the attached disk for carrying the supports of the cultivator shovels. Fig. 5 is an enlarged perspective view of one of the concaved cultivator shovels.

My invention is not restricted to the precise construction and arrangement of parts herein shown and described, nor to the various details thereof, as the same may be modified or rearranged in various particulars without departing from the spirit and scope of my invention, one practical embodiment of which has been herein illustrated and described without attempting to show all of the various forms in which my invention might be embodied.

My improved cultivator has a metal frame 1 supported on a pair of carrying wheels 2, the latter being rotatably mounted upon the outturned ends of the arms 4 of a bail shaped body or axle 3 which is rockingly or swingingly mounted in bearing apertures in the side parts or members of said frame.

Referring to Fig. 2, the numeral 5 denotes a sleeve loosely mounted on each end of the arms 4 of said axle 3 and has an integral plate 6 attached provided with a socket in its upper part for the spherical lower end of a vertically disposed screw 6 which works through an interiorly threaded hole in a bracket arm 7 which screw may be turned to adjust the vertical position of the frame relatively to said carrying wheels 2 with nuts on the screw stem to hold the same secured to the frame in the adjusted position.

The forward end of the frame has convergent bars 8 whose terminations are opposed and apertured to receive a link 9 of a hook which may receive another hook 10 or any other desired flexible connection to the rear part 11 of a tractor.

Referring to said Fig. 4, the numeral 13 denotes a pair of relatively large sprocket-wheels which are mounted rotatably upon roller bearings 28 upon the opposite ends of a shaft 12 whose terminations are fixed to the opposite side-bars of the frame 1. Disks 24 are secured by bolts 25 to the inner faces of the arms of the sprocket-wheels 13 concentrically and the disks 24 are castings into which are secured the ends of a number of transverse cylindrical supports 29 for shovels 32. Each disk 24 has an inwardly directed hub part with central aperture of greater diameter than the shaft 12 to permit the seating in the aperture around the shaft of anti-friction rollers 28 and a raceway sleeve therearound of a closure member 26 which member is secured by bolts 27 passed through the disk and the sprocket-wheel 13. The shovels 32 are preferably arranged along the supporting members 29 in staggered relation, but may be otherwise relatively arranged as desired. The numeral 30 denotes clamps which may be secured in a tight-and-loose mounting upon the support 29, and are adapted to connect a shovel 32 to the support 29, the clamps being secured to each other and to the shovel by bolts 31 and 33 respectively. The shovels are thus secured upon the supports 29 tightly enough to perform their function in removing grass from among alfalfa plants, but in case a shovel strikes some relatively fixed object such as a stone or root, the clamps may turn on the support 29 to pass over the obstacle without breakage. Each shovel is preferably shaped so that its advancing face is of angular cross section, that is, each shovel is longitudinally troughed to have its trough open rearwardly relative to its direction of forward movement and rotation with the support 29 on the shaft 12, the object being the uprooting and throwing back upon the surface of the ground June grass which is shallowly rooted, the advancing rearwardly angularly sloping side parts of each shovel sliding past the deeply set alfalfa roots without injuring them.

Apertured standards or bearings 17 are fixed upon the frame to receive the ends of a rotatable shaft 16 which carries at its ends relatively small sprocket-wheels 15, and sprocket-chains 14 connect the wheels 15 with the large sprocket-wheels 13. At or near the middle of the shaft 16 is mounted a bevel-gear 18 in mesh with a bevel-pinion 19 on the rear end of a medial longitudinal shaft 20 set in apertured bearing standards 21 secured on the frame 1. A universal joint 22 connects the forward end of the shaft 20 to the rear end of a shaft 23 which is rotated by a motor (not shown) on the tractor frame 11 in advance.

It will be observed that this cultivator and its rotating shovels 32 will dig out and throw rearwardly upon the top of the ground to dry out, the shallowly rooted grass which grows profusely amid alfalfa roots, and that the alfalfa roots will not be injured by the shovels because of their peculiar shape which permits them to slide past the stronger alfalfa roots while removing the diffusely spread grass roots.

This invention by slight modifications, within the scope of the claims, may be adapted for varying uses in any kind of cultivation as desired.

Having described my invention, what I claim as new, and desire to secure by Letters Patent, is:

1. In a cultivator, a rotary carrier mounted for transportation, and spaced longitudinal rows of outwardly directed shovels mounted thereon, in staggered relation, each downwardly directed shovel having its forwardly advancing face shaped with rearwardly directed and outwardly sloped faces diverging from a medial longitudinal ridge.

2. In a cultivator, a rotary carrier mounted for transportation and for vertical adjustments, means for rotating said carrier, and shovels each projecting outwardly from the carrier having an angular cross section and when downwardly directed with its angular faces directed forwardly while the carrier is rotating.

In testimony whereof I affix my signature.

WILLIAM M. LEWIS.